United States Patent
Lehmann

[15] 3,649,125
[45] Mar. 14, 1972

[54] DIRECTION SENSING METHOD AND APPARATUS FOR LASER DOPPLER VELOCITY MEASUREMENTS

[72] Inventor: Bernhard Lehmann, Berlin, Germany
[73] Assignee: Licentia Patentverwaltungs GmbH, Frankfurt, Germany
[22] Filed: Aug. 18, 1969
[21] Appl. No.: 850,935

[30] Foreign Application Priority Data

Aug. 17, 1968 Germany ..................P 17 98 076.6

[52] U.S. Cl. ..................356/28, 356/28, 356/103, 356/104, 356/106
[51] Int. Cl. ..................................G01p 3/36
[58] Field of Search ..................356/28, 29, 1, 5, 103, 104, 356/106; 343/9; 250/203 X, 43.5 FC, 218, 237 G; 350/160; 73/194 R, 199 E

[56] References Cited

UNITED STATES PATENTS

| | | | |
|---|---|---|---|
| 3,345,909 | 10/1967 | De Maria | 356/28 |
| 3,362,024 | 1/1968 | Badewitz | 343/17.5 |
| 3,437,399 | 4/1969 | Eden | 350/160 |
| 3,428,816 | 2/1969 | Jacobs et al. | 250/218 |
| 3,446,558 | 5/1969 | Seaton | 356/28 |
| 3,419,330 | 12/1968 | Schneider | 356/106 |
| 2,886,717 | 5/1959 | Williamson et al. | 250/237 G |

FOREIGN PATENTS OR APPLICATIONS

| | | | |
|---|---|---|---|
| 1,953,630 | 3/1970 | Germany | 356/28 |

OTHER PUBLICATIONS

Rowe et al., " Surface Topography Of Non-optical Surfaces By Projected Interference Fringes," Nature, Vol. 216, Nov. 25, 1967, pp. 786– 7

Primary Examiner—Rodney D. Bennett, Jr.
Assistant Examiner—S. C. Buczinski
Attorney—Spencer & Kaye

[57] ABSTRACT

Two beat frequencies due to doppler measurement of the velocity component of a moving object are produced and the difference in their frequencies compared to determine the direction of object movement along the path of the velocity component. One beat frequency is provided by producing first and second radiant energy energy fields whose frequency difference is a function of the sign of the velocity component. The other beat frequency is provided by periodically shifting the phase of one of the radiant energy fields variably with respect to time. The radiant energy fields are produced by a laser device and the phase shift is effected by applying a sawtooth charging voltage to a Pockels cell interposed in the path of one of the laser beams.

14 Claims, 5 Drawing Figures

Inventor:
Bernhard Lehmann
By: Spencer & Kaye
Attorneys

DIRECTION SENSING METHOD AND APPARATUS FOR LASER DOPPLER VELOCITY MEASUREMENTS

BACKGROUND OF THE INVENTION

Doppler velocity measuring processes employing radiant energy are well known and doppler laser processes employing optical radiation are in particular normally limited to the determination only of the magnitude of the doppler frequency change. That is to say, since the velocity of moving objects normally encountered is very small compared with the frequency of the optical radiation, the doppler frequency is in the order of the frequency of light and, as a result, the time resolution capability of optical-electronic receiving instruments is insufficient to determine the positive or negative aspect of the velocity component of the moving object. Thus, although the magnitude of the doppler frequency and its measurement allow the determination of the path of the velocity component, it does not provide any information concerning which of the two directions the object is moving along the path, i.e., whether the velocity is positive or negative.

SUMMARY OF THE INVENTION

The present invention is directed to method and apparatus for overcoming the above deficiency. Essentially, the present invention concerns the production of two sequential beat frequency signals, each of which may be of such high frequency that the above problem would be encountered with either, but whose difference in frequency, or frequency spectrum, is small and may be determined and which will provide the necessary information as to the positive or negative aspect of the velocity component being measured. The first beat frequency may be produced by known methods which involve the detection of doppler frequency difference between two radiant energy fields wherein the doppler frequency is related to the velocity component of the moving object. The second beat frequency is produced by phase shifting one of the radiant energy fields variably with respect to time. Dependent upon the nature of the phase shift, comparison between the frequencies of the two beat frequencies will establish the positive or negative aspect of the velocity component.

DETAILED DESCRIPTION OF THE INVENTION

Figure 1:
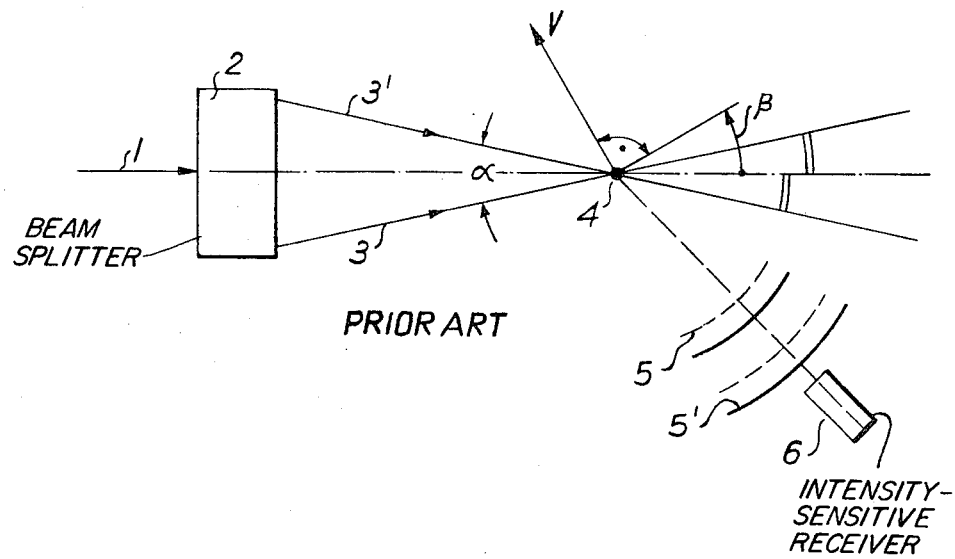
FIG. 1 is a diagrammatic view illustrating the prior art.

FIG. 1 illustrates a prior art device in which two-directional radiation impingement on the moving object 4 is employed. The laser beam 1, of frequency $f_0$, is divided into the two partial beams 3 and 3' by means of the beam divider 2, such partial beams being directed toward the moving object 4 under the convergence angle $\alpha$. The object 4 is moving at velocity V in the direction shown along a path perpendicular to the plane which is at the angle B with respect to the angle bisector of the angle $\alpha$. Due to dispersion upon impingement on the object 4, the two partial beams 3 and 3' produce two spatial, scattered light fields 5 and 5' whose frequencies are doppler-shifted to different degrees due to the different directions of impingement.

The intensity-sensitive receiver 6 measures the intensity of the beat frequency $\Delta f$ produced by interference between the two scattered light fields 5 and 5', the intensity being equal to the doppler-shifted frequency.

If $n$ is the index of refraction of the medium surrounding the object and $\lambda_0$ is the wavelength of the laser light in vacuum:

$$\Delta f = 2Vn/\lambda_0 (\cos \beta \sin \alpha/2). \quad (1)$$

With the arrangement of FIG. 1, it will be appreciated that the exact position and path of the velocity component may be determined from equation (1). However, to determine the positive or negative aspect of the velocity component to establish which direction the object is moving along its path, the sign of $\Delta f$ would have to be known. That is, if $f_1$ is the frequency of the field 5 and $f_2$ that of the field 5', with $\Delta f = f_1 - f_2$, the sign of $\Delta f$, whether positive or negative, is necessary to complete the information as to the velocity component with the arrangement of FIG. 1. However, contemporary optical-electronic means are incapable of determining the sign of $\Delta f$ and the measured value is always $|\Delta f|$.

This drawback becomes particularly troublesome when the velocity vector of an object is being measured in space by means of three-component measurement by radiation upon the object from three directions. When the negative or positive aspects of the individual measurements are unknown, there is an eight-fold inaccuracy possibility.

The above problem is present with other optical arrangements which may be employed. For example, a common arrangement involves the replacement of one of the scattered light fields of FIG. 1 by a reference beam which is uninfluenced in frequency by the moving object but which is derived by splitting the original laser beam and incorporation thereof in the received scattered light.

Figure 2:
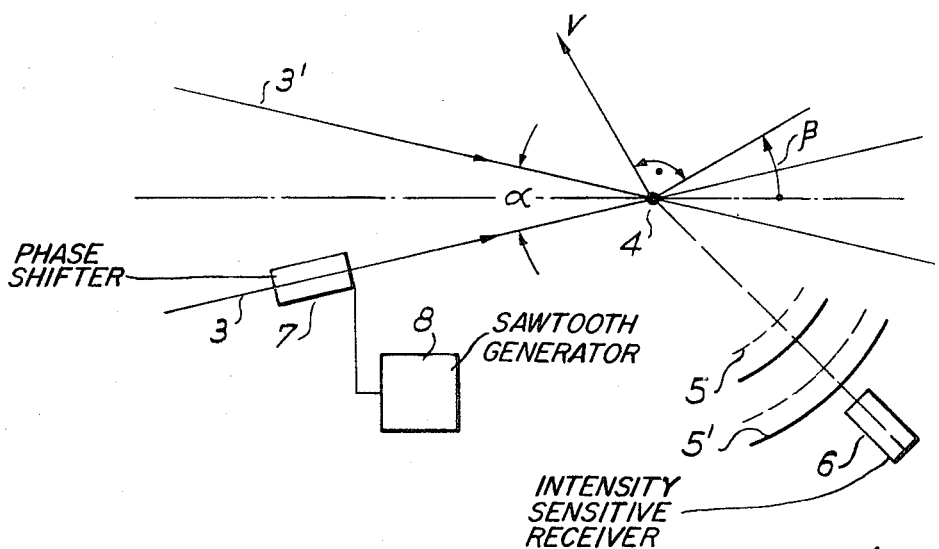
FIG. 2 is a view similar to FIG. 1 but illustrating the principles of the present invention.

With reference to FIG. 2, the present invention may take the form in which a phase-shifting device 7 is interposed in the path of the partial laser beam 3. The device 7 may be continuously or intermittently controlled by the device 8 so that at successive times, a first beat frequency is produced by the fields 5 and 5' as described above and then a second beat frequency is produced by phase-shifting of one of the fields in the fashion hereinafter described. As will also be shown hereinafter, the difference in frequencies between these two beat frequencies may be compared readily and their comparison will provide the necessary data as to the sign of $\Delta f$ in equation (1).

The two partial beams in FIG. 2 provide the two scattered light fields 5 and 5' by dispersion, the electrical field intensities of these fields oscillating approximately according to:

$$E_1 = A_1 \cos(\omega_1 t + \phi_1) \quad (2)$$
$$E_2 = A_2 \cos(\omega_2 t + \phi_2) \quad (3)$$

where $t$ = time, $A$ = amplitude, $\omega$ = angular frequency ($\omega = 2\pi f$), and $\phi$ = phase shift. The frequency difference $\Delta\omega = \omega_1 - \omega_2$ is measured by the intensity-sensitive receiver 6.

The intensity which results from the superposition of both fields is $I = (E_1 + E_2)^2$ and when all members with frequencies in the order of magnitude of the laser light frequency which can not be resolved are neglected:

$$I \approx \cos[(\omega_1 - \omega_2)t + (\phi_1 - \phi_2)], \text{ or} \quad (4)$$
$$I \approx \cos(\Delta\omega t + \Delta\phi) \quad (5)$$

The phase difference $\Delta\phi$ is arbitrary in the laser doppler measurements and is constant in time for the moment of measurement so that it is not incorporated in the frequency and is of no interest. However, by constraining the phase difference of the second beat frequency to be time-dependent, that is by making $\Delta\phi = \Delta\phi(t)$ with known sign, the sign of $\Delta\omega = 2\pi f$ may be established and thus the incapacity of the prior art arrangements of determining the sign of $\Delta f$ by frequency measurement is overcome.

In the simplest case, the phase shift which produces the second beat frequency may be linearly variable with time, i.e., $\Delta\phi(t) = \Phi \cdot t + C$, where $\Phi$ and C are constants. The constant C may be disregarded so that equation (5) becomes, for the second beat frequency:

$$I \approx \cos(\Delta\omega + t, \quad (6)$$

where $\Delta\omega + \Phi$ is the new, or second beat frequency:

$$\Delta\Omega = \Delta\omega + \Phi \quad (7)$$

Since knowledge of the sign of $\Phi$ is presupposed, the following relations may be established:

for $\Phi > 0$ and $\omega > 0$, $|\Delta\Omega| > |\Delta\omega|$; \quad (8)
for $\Phi > 0$ and $\omega < 0$, $|\Delta\Omega| < |\Delta\omega|$; or \quad (9)
for $\Phi < 0$ and $\omega > 0$, $|\Delta\Omega| < |\Delta\omega|$; \quad (10)
for $\Phi < 0$ and $\omega < 0$, $|\Delta\Omega| < |\Delta\omega|$. \quad (11)

These relations are unequivocal as long as $|\Phi| < 2\Delta\omega$ which may be realized readily within the state of the present art.

Figure 3:
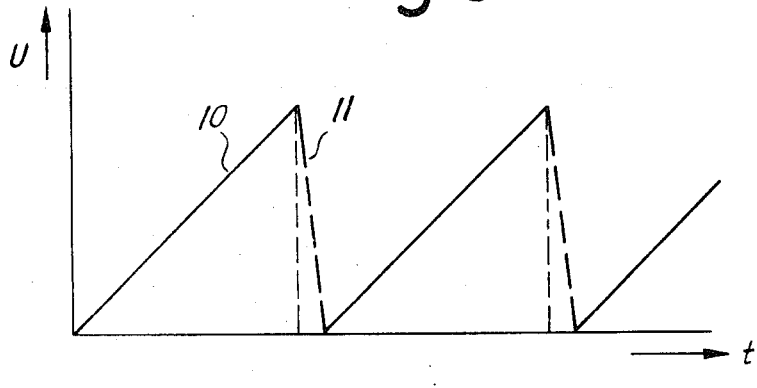
FIG. 3 is an illustration of the sawtooth waveform applied to the Pockels waveform of FIG. 2.

To achieve the above, the device 7 of FIG. 2 may be an electro-optical cell, for example a Pockels cell, which is interposed in the path of one of the partial beams 3 or 3' or in the reference beam of the other prior art embodiment described above. The Pockels cell 7 is excited by a high-frequency sweep generator having a voltage output waveform of the type shown in FIG. 3. The index of refraction of the cell 7 varies linearly with the positive-going ramp 10 of the sawtooth waveform which, as shown, increases linearly with time so that during the time interval of the ramp 10, the second beat frequency $\Delta\Omega$, as above described, is produced.

Figure 4A:
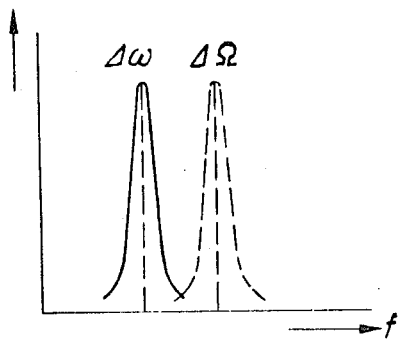
FIGS. 4a and 4b are views illustrating the visual displays of frequency spectrum analyzing devices which may be used to determine the positive or negative aspect of the velocity component being measured.
Figure 4B:
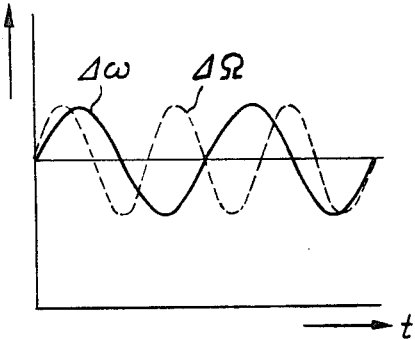

The two beat frequencies $\Delta\omega$ and $\Delta\Omega$ may be observed, for example, in a spectrum analyzer such as an oscillograph, examples being illustrated in FIGS. 4a and 4b. Assuming for either figure that $\Phi > 0$ as established by the waveform of FIG. 3, and noting that $|\Delta\Omega| > |\Delta\omega|$, relationship (8) above indicates that $\Delta\omega > 0$ which establishes the required remaining information in connection with the velocity component, i.e., $\Delta\omega = 2\pi f$ is positive. This information plus the information provided in the usual fashion as per equation (1) completely identifies the velocity component being measured. The choice of phase shift which is linear with respect to time is advantageous in that the observed frequency change produces a fixed frequency image with constant $\Delta\omega$. However, it is to be understood that phase shifting which is non-linear with respect to time may be employed if desired.

With the arrangement as described, relative frequency changes $$\frac{\Delta\Omega| - |\Delta\omega|}{\Delta\omega|}$$

of 20 percent to 30 percent may be obtained easily for values of $\Delta\omega$ normally encountered by proper selection of the dimensions of the cell 7, and the maximum voltage and frequency of the sawtooth waveform.

The negative-going ramp 11 of the sawtooth waveform is of such short time duration that a frequency $$|\Delta\Omega''| \gtrless |\Delta\omega|$$

is produced. This frequency may cause ambiguities and, in such case, the laser light beam may be cut off during this time. Thus, the first beat frequency $\Delta\Omega$ would be produced during a portion of the time of the positive-going ramp 10 and during which time such ramp voltage is not applied to the cell 7; the second beat frequency $\Delta\omega$ would be produced during a subsequent portion of the ramp time; by short-time keying of the sawtooth voltage, i.e., by applying the sawtooth voltage to the Pockels cell 7 for a short period of time, and, as noted, the laser light partial beam through the cell 7 would be cut off during the time of the ramp 11.

Alternatively, the sawtooth waveform may be designed such as to produce the beat frequency $$|\Delta\Omega'| \approx 0 \quad \text{or} \quad \Delta\Omega'' \approx 2|\Delta\omega|$$

due to the ramp 11, in which case the beat frequency $\Delta\Omega$ may be distinguished easily without requiring the laser light to be cut off during ramp 11 time.

It will be understood that the above description of the present invention is susceptible to various modifications, changes and adaptations.

I claim:

1. A method for determining the positive or negative aspect of the velocity component of a moving object, comprising the steps of:

producing first and second radiant energy fields whose interference provides a beat frequency which is a function of the velocity component of a moving object;

periodically shifting the phase of one of said radiant energy fields as a variable with respect to time to provide a second beat frequency which also is a function of the velocity component of the moving object; and comparing the first and second beat frequencies to determine the positive or negative aspect of the velocity component of the moving object.

2. The method according to claim 1 wherein the phase of said one radiant energy field is shifted in phase linearly with respect to time.

3. The method according to claim 2 wherein said first and second radiant energy fields are effected by laser beams, the phase shift being effected by a Pockels cell charged with a sawtooth voltage waveform.

4. The method as defined in claim 3, wherein the phase of said one of said radiant energy fields is periodically shifted by short time keying of the sawtooth voltage applied to the Pockels cell influence on the frequency.

5. The method as defined in claim 1 wherein said one of said radiant energy fields is periodically shifted in phase prior to the impingement of same on said moving object.

6. The method according to claim 1 wherein said first and second radiant energy fields are effected by laser beams.

7. Apparatus for determining the positive or negative aspect of the velocity component of a moving object, comprising, in combination:

means for producing first and second radiant energy fields whose interference produces a first beat frequency which is a function of the velocity component of a moving object;

means for periodically shifting the phase of one of said radiant energy fields as a function of time to produce a second beat frequency different from said first beat frequency and which is also a function of the velocity component of the moving object; and means for determining, from the frequency spectrum of said first and second beat frequencies, the positive or negative aspect of the velocity component being measured.

8. Apparatus according to claim 7 wherein said one radiant energy field is phase-shifted linearly with respect to time.

9. Apparatus according to claim 8 wherein the first mentioned means is a laser device.

10. Apparatus according to claim 7 wherein the first mentioned means is a laser device.

11. Apparatus according to claim 10 wherein said laser device produces first and second beams which produce said first and second radiant energy fields; and wherein said phase shifting means includes a Pockels cell interposed in the path of one of said beams, and means for periodically charging said cell with a sawtooth voltage waveform.

12. The apparatus as defined in claim 8 wherein said phase shifting means periodically shifts the phase of said one of said radiant energy fields prior to the impingement of same on said moving object.

13. A doppler laser velocity measurement system for determining the positive or negative aspect of a velocity component of a moving object whose velocity is small compared to the velocity of light, comprising, in combination:

means for producing interfering optical fields providing first and second beat frequencies whose frequency difference is very much less than the laser light frequency; and means for determining the positive or negative aspect of said velocity component from said frequency difference of the beat frequencies.

14. A method of doppler laser velocity measurement for determining the positive or negative aspect of a velocity component of a moving object whose velocity is small compared to the velocity of light, comprising the steps of:

producing interfering optical fields providing first and second beat frequencies whose frequency difference is very much less than the laser light frequency; and determining the positive or negative aspect of said velocity component from said frequency difference of the beat frequencies.

* * * * *